May 2, 1939.  E. H. BUCKNELL ET AL  2,156,800

SHOWER HEAD

Filed Oct. 14, 1936

INVENTORS
Ernest H. Bucknell
Ralph E. Bletcher
BY Lyon & Lyon
ATTORNEYS

Patented May 2, 1939

2,156,800

UNITED STATES PATENT OFFICE 2,156,800

SHOWER HEAD

Ernest H. Bucknell and Ralph E. Bletcher, Los Angeles, Calif.

Application October 14, 1936, Serial No. 105,543

6 Claims. (Cl. 299—130)

This invention relates to shower heads and more particularly to a shower head applicable for use in shower baths.

It is one of the principal objects of this invention to disclose a shower head capable of converting a stream of relatively high velocity water into an abundant quantity of a very finely divided and evenly distributed soft spray of relatively low velocity.

A further object is to arrange the above mentioned shower head whereby all of its water passages are of relatively large size and of more or less simple, smooth and straightforward outline whereby clogging of the discharge passages is eliminated.

A further object is to utilize the velocity of a stream for atomizing the water into a compact, finely divided and evenly distributed soft spray, of relatively low velocity.

A further object is to arrange the shower head whereby the quality or fineness of spray may be easily adjusted.

A further object is to disclose a shower head which is of simple design, inexpensive of manufacture and effective and efficient in operation.

Other objects and advantages of the invention will become apparent as the nature of the same is more fully understood from the following description and accompanying drawing wherein is set forth what is now considered to be a preferred embodiment. It should be understood, however, that this particular embodiment of the invention is chosen principally for the purpose of exemplification, and that variations therefrom in details of construction or arrangement of parts may accordingly be effected and yet remain within the spirit and scope of the invention as the same is set forth in the appended claims.

Figure 1:
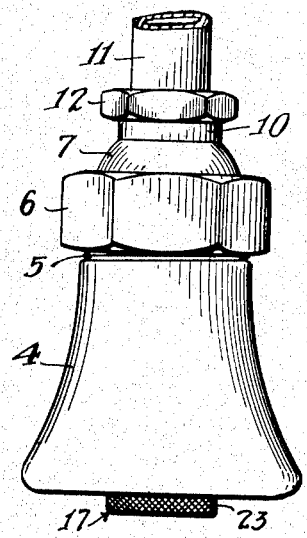
Fig. 1 illustrates a side elevational view of the shower head of this invention.

The spray head may include a body member 4 of more or less bell shape, but it is to be understood that this member may be constructed in many different shapes and forms. The extreme upper end of this member is threaded as at 5 to receive the socket nut 6, which acts to hold the member 4 onto the socket ball 7. The member is provided with a spherical seat 8 for receiving the socket ball 7 and gasket 9 is provided to seal the joint against leakage. By this arrangement the member is free for limited angular adjustment as is customary for shower heads. The socket ball 7 is provided with a threaded boss 10 to receive the water supply pipe 11 and with a hexagon flange 12 for the purpose of enabling the socket ball to be screwed onto the pipe. The socket ball is hollow and its inner end is provided with a suitable discharge opening 13.

The body member is more or less hollow in construction and the hollow portion extending from the socket ball to the orifice diaphragm 14 will be referred to as the inlet passage 15a. The shape of this passage 15a is of no great importance so long as it provides a free passage for the water to the diaphragm 14. An orifice 15 extends through the diaphragm to communicate the inlet passage 15a with an annular tortuous deflecting passage 16. The shape and area of this passage is important as it controls the breaking or atomizing of the water into a finely divided soft spray. One side wall of the atomizing passage 16 is formed in the body member 4 while the other is provided by means of an appropriately shaped plug member 17. It is preferable to adjustably mount the plug in the body member whereby the opening of the orifice 15 may be adjusted to control the quantity and fineness of the spray. The plug mounting may include providing the body member, in its inlet passage portion, with a threaded boss 18 supported from the body member by three arms 19 and by threading shank 20 of the plug into the boss. Stop washer 21 is fastened to the end of shank 20 by suitable screw means 22 to prevent the plug from being outwardly adjusted beyond a maximum setting. As may be observed in Fig. 2, shank 20 extends through orifice 15 and supports on its outer end the plug member 17.

It may be noted that shank 20 does not completely fill the orifice. Sufficient space, forming what may be termed an annular orifice for the water to discharge through, is maintained. The extreme lower end portion of plug 17 is knurled as at 23 to provide a convenient hand grip for screwing the plug to its desired operating setting. The plug acts to control the volume of water passing through the orifice 15 thereby controlling the quantity and quality of spray produced. For this purpose the plug is provided with a throttling cone 24 which, as the plug is screwed-in, enters the orifice as shown in full lines in Fig. 2 to reduce the effective area of the orifice, thus throttling the flow of water.

The tortuous sharply angled deflecting passage 16 which forms the atomizing means or passage is defined by the inner surface of the body member extending from the orifice to the end of this member and by the various angular external surfaces of the plug. In the body member the deflecting surfaces are designated 26 and 27 and as may be noted in the drawing these surfaces are arranged sharply angular to each other. The extreme end of the body 4 is provided with a counterbored portion 28 which acts to limit the divergence of the spray when the plug 17 is in the flushing position, illustrated in broken lines in Fig. 2.

Figure 2:
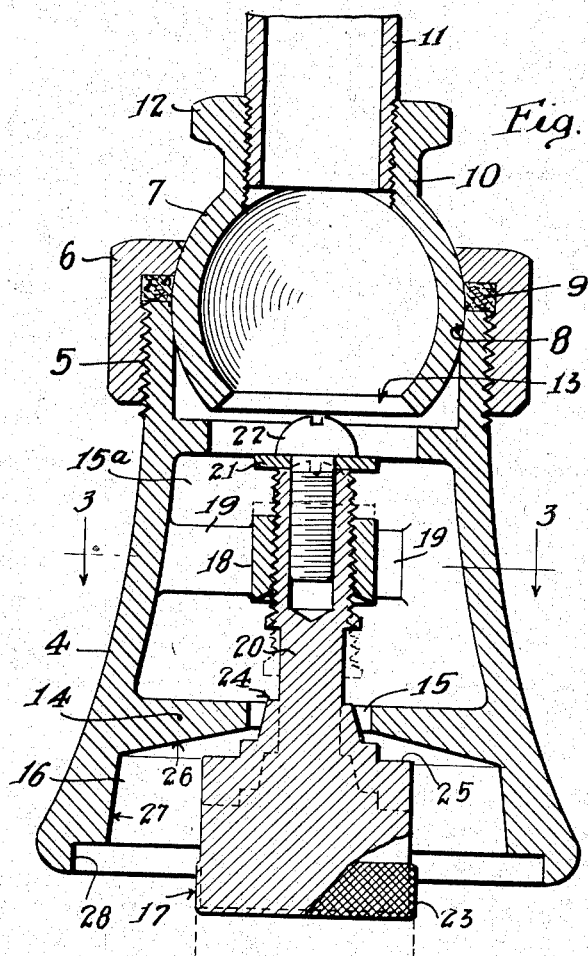
Fig. 2 illustrates an enlarged longitudinal sectional view of Fig. 1.
Figure 3:
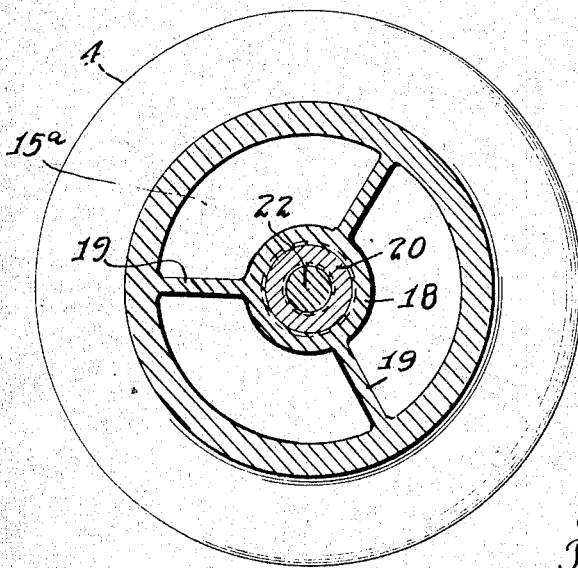
Fig. 3 illustrates a sectional view taken substantially in the plane of line 3—3 of Fig. 2.

In operation, a supply of water is furnished through pipe 11 under the usual pressure as found in the ordinary household. This water flows freely into the inlet passage of the body member and should the plug be adjusted, as indicated in full lines in Fig. 2 (a normal setting therefor), the water will discharge through the annular space formed between the orifice and throttling cone with relatively high velocity and will dash against the deflecting surface 25 to form a more or less mushroom or umbrella shaped sheet-like spray which will ricochet across the atomizing channel and strike against the deflecting surfaces 26 and possibly 27 of the body member before leaving the head in the form of a very finely divided soft spray of relatively low velocity. The quality of the spray is controlled by adjusting the plug member. The shower head may be flushed by unscrewing the plug until it reaches the broken line position as shown in Fig. 2.

The relatively high velocity water discharging through the orifice literally breaks itself to pieces as it impinges against first one deflecting surface and then the other. Each impact further breaks the water and also as the energy of the water is absorbed its velocity is diminished until finally it emerges from the head very finely atomized and at a relatively low velocity. In other words, the kinetic energy of the water discharging through the orifice is made use of to accomplish the atomization thereof. A shower head of the type set forth herein has proved very satisfactory in actual practice and discharges a conical, finely atomized spray in which the particles fill substantially the entire cone and move at a relatively low velocity. There are no open spaces in the spray, such as there are in other spray heads now commonly used.

The spray produced by the shower head of this invention, due to its fineness, quantity and gentleness of discharge, gives a very pleasing and satisfactory shower.

It will be understood that this invention may be made use of for purposes other than shower baths.

Having fully described the invention, it is to be understood that it is not to be limited to the details herein set forth, but the invention is of the full scope of the appended claims.

We claim:

1. In a shower head, the combination of a body member having a restricted throat and a skirt extending from the throat, a plug member adapted to be secured in the throat, a plane deflecting surface formed on the plug member below the throat, the direction of flow of water through the restricted throat being in a direction substantially normal to the deflecting surface so that the said plane deflecting surface and the inner wall of the skirt act to successively deflect the flow of water through the head to break the water into fine drops and disperse the same below the head and to break the force of water emitting from the head to produce a completely filled cone of drops of water of relatively low velocity.

2. In a shower head, the combination of a plug member and a body, the body member having a restricted throat, and means adjustably securing the plug member in the body member in a substantially concentric position relative to the throat, the plug member having a substantially plane deflecting surface the said deflecting surface being formed substantially normal to the direction of flow through the restricted throat, and the body member having an annular skirt section housing a portion of the plug member, and the skirt section providing deflecting surfaces against which the water deflected from the plug member is impinged to break the flow of water into individual fine drops and to retard the velocity thereof.

3. In a shower head, the combination of a body member having a transverse web providing a restricted throat and a skirt arranged below said web, a plug member adapted to be secured in the throat, and deflecting steps formed on the plug below the throat, said steps being formed substantially normal to the direction of flow through the throat, the said deflecting surfaces so formed and the inner wall of the skirt acting to successively deflect the flow of water through the head to break the water into fine drops and disperse the same below the head.

4. In a shower head, the combination of a body member having a restricted throat and a skirt extending from the throat, a plug member mounted in position in the throat, said plug member having a tapered section to control the cross-sectional area of the passage through the throat, and a deflecting surface formed on the plug member below the tapered section, said deflecting surface being formed substantially normal to the direction of flow through the throat, and the said deflecting surface and inner wall of the skirt acting to successively deflect the flow of water through the head to break the water into fine drops and disperse the same below the head.

5. In a shower head, the combination of a body member having a restricted throat and a skirt extending from the throat, a plug member secured in said throat, and a stepped deflecting surface formed on the outer periphery of said plug below said throat, the direction of flow of water through the restricted throat being a direction substantially normal to the deflecting surface so that said stepped deflecting surface and the inner wall of said skirt act to successively deflect the flow of water through the head to break the water into fine drops and disperse the same below the head and to break the force of the water emitting from the head to produce a substantially completely filled cone of drops of water of relatively low velocity.

6. In a shower head, the combination of a plug member and a body, the body member having a restricted throat, and means securing the plug member to the body member in relatively adjustable relation with respect to said throat, said plug member having a stepped external deflecting surface, said deflecting surface including portions disposed substantially normal to the direction of flow through said restricted throat, the body member having an annular skirt section housing a portion of the plug member, said skirt section providing deflecting surfaces against which the water deflected from the plug member impinges, said skirt surfaces cooperating with said stepped deflecting surface to break the flow of water into individual fine drops and to retard the velocity thereof.

ERNEST H. BUCKNELL.
RALPH E. BLETCHER.